US011956643B2

(12) United States Patent
Toshinaga et al.

(10) Patent No.: US 11,956,643 B2
(45) Date of Patent: Apr. 9, 2024

(54) STATION PLACEMENT DESIGNING METHOD, STATION PLACEMENT DESIGNING APPARATUS AND PROGRAM

(71) Applicant: NIPPON TELEGRAPH AND TELEPHONE CORPORATION, Tokyo (JP)

(72) Inventors: Hideki Toshinaga, Musashino (JP); Naoki Kita, Musashino (JP); Yushi Shirato, Musashino (JP); Hideyuki Tsuboi, Musashino (JP); Kazuto Goto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 269 days.

(21) Appl. No.: 17/422,950

(22) PCT Filed: Jan. 15, 2020

(86) PCT No.: PCT/JP2020/001014
§ 371 (c)(1),
(2) Date: Jul. 14, 2021

(87) PCT Pub. No.: WO2020/149291
PCT Pub. Date: Jul. 23, 2020

(65) Prior Publication Data
US 2022/0078630 A1 Mar. 10, 2022

(30) Foreign Application Priority Data
Jan. 18, 2019 (JP) .................. 2019-007230

(51) Int. Cl.
*H04W 16/18* (2009.01)
(52) U.S. Cl.
CPC .................. *H04W 16/18* (2013.01)
(58) Field of Classification Search
CPC ....... H04W 16/18; H04W 24/02; G01S 17/10; G01S 17/88; G06V 20/176; H04B 17/27
See application file for complete search history.

(56) References Cited

U.S. PATENT DOCUMENTS 5,890,076 A * 3/1999 Takano ................. H04W 16/18
455/67.11
9,602,224 B1 * 3/2017 McLaughlin ........... G01S 17/10
(Continued)

FOREIGN PATENT DOCUMENTS

JP 4295746 B2 7/2009
JP 6377666 B2 8/2018
WO WO-2020203501 A1 * 10/2020 ............ H04W 24/06

OTHER PUBLICATIONS

Djordje Tujkovic et al., Changes to IEEE 802.11ay in support of mmW Distribution Network Use Cases, literature, Jul. 10, 2017, https://mentor.ieee.org/802.11/dcn/17/11-17-1022-00-00ay-changes-to-IEEE-802-11ay-in-support-of-mmw-mesh-network-use-cases.pptx.
(Continued)

Primary Examiner — Matthew C Sams
(74) Attorney, Agent, or Firm — Harness, Dickey & Pierce, P.L.C.

(57) ABSTRACT

A station placement design method includes: extracting candidates for an installation location of a wireless base station from point group data in accordance with designated conditions for an installation location of a wireless base station; determining presence/absence of visibility between a plurality of designated wireless terminal stations and the candidates for an installation location of a wireless base station based on the point group data and generating a first list including information in which the candidates for an installation location of a wireless base station and wireless terminal stations determined to have presence of visibility for the candidates for an installation location of a wireless base station are associated with each other; generating a second list including information representing combinations of the candidates for an installation location of a wireless base station that enable all of the plurality of designated
(Continued)

wireless terminal stations to be accommodated based on the first list; and sorting the second list in order from the smallest number of the candidates for an installation location of a wireless base station to the largest.

10 Claims, 17 Drawing Sheets

(56) References Cited

U.S. PATENT DOCUMENTS 10,021,576 B1 * 7/2018 McLaughlin ........... G01S 17/10
2016/0327628 A1 * 11/2016 Perez-Cruz ............... G01S 5/14

OTHER PUBLICATIONS

Millimeter Wave (MMWAVE) Networks, Telecom Infra Project, Sep. 26, 2018(Reading Day), https://telecominfraproject.com/mmwave/.

Nippon Telegraph and Telephone Corporation, AI B-10 that supports humans Spatial state estimation technology that promotes equipment maintenance work support 3D point cloud analysis technology is used to database the real world, NTT R&D Forum 2017, Feb. 13, 2017, http://www.ntt.co.jp/RD/active/201702/jp/pdf_jpn/02/B-10_j.pdf.

Ignitenet, MetroLinq™ 2.5G 60 Beamforming Sector, Datasheet, literature, Dec. 26, 2018(Reading Day), https://www.ignitenet.com/downloads/datasheets/MetroLinq-2.5G-60-BF-sector-datasheet.pdf.

* cited by examiner

| EVALUATION ORDER | CANDIDATE FOR INSTALLATION LOCATION OF WIRELESS BASE STATION | NUMBER OF WIRELESS TERMINAL STATIONS HAVING VISIBILITY PRESENCE | WIRELESS TERMINAL STATION HAVING VISIBILITY PRESENCE | NUMBER OF WIRELESS TERMINAL STATIONS HAVING VISIBILITY ABSENCE | WIRELESS TERMINAL STATION HAVING VISIBILITY ABSENCE |
|---|---|---|---|---|---|
| 1 | H | 9 | 1, 2, 3, 4, 5, 6, 10, 11, 12 | 7 | 7, 8, 9, 13, 14, 15, 16 |
| 1 | G | 9 | 5, 6, 7, 8, 9, 12, 13, 14, 15 | 7 | 1, 2, 3, 4, 10, 11, 16 |
| 3 | F | 7 | 3, 4, 5, 6, 11, 12, 13 | 9 | 1, 2, 7, 8, 9, 10, 14, 15, 16 |
| 4 | E | 6 | 5, 6, 7, 12, 13, 14 | 10 | 1, 2, 3, 4, 8, 9, 10, 11, 15, 16 |
| 5 | A | 5 | 1, 2, 3, 10, 11 | 11 | 4, 5, 6, 7, 8, 9, 12, 13, 14, 15, 16 |
| 5 | B | 5 | 7, 8, 9, 15, 16 | 11 | 1, 2, 3, 4, 5, 6, 10, 11, 12, 13, 14 |
| 7 | C | 3 | 9, 15, 16 | 13 | 1, 2, 3, 4, 5, 6, 7, 8, 10, 11, 12, 13, 14 |
| 8 | D | 1 | 16 | 15 | 1, 2, 3, 4, 5, 6, 7, 8, 9, 10, 11, 12, 13, 14, 15 |
| ... | ... | ... | ... | ... | ... |

| EVALUATION ORDER | COMBINATION OF CANDIDATES FOR INSTALLATION LOCATION OF WIRELESS BASE STATION |
|---|---|
| 1 | H, G, B |
| 1 | H, G, C |
| 1 | H, G, D |
| 1 | H, E, B |
| 2 | F, E, A, B |
| 2 | F, E, A, C |
| 2 | F, E, A, D |
| 3 | ... |
| ⋮ | ⋮ |

Fig. 6

| EVALUATION ORDER | COMBINATION OF CANDIDATES FOR INSTALLATION LOCATION OF WIRELESS BASE STATION | ACCOMMODATION PATTERN OF WIRELESS TERMINAL STATION IN EACH CANDIDATE FOR INSTALLATION LOCATION OF WIRELESS BASE STATION | | STANDARD DEVIATION |
|---|---|---|---|---|
| 1 | H, G, B | H | 1, 2, 3, 4, 10, 11 | 0.47 |
| | | G | 5, 6, 12, 13, 14 | |
| | | B | 7, 8, 9, 15, 16 | |
| 1 | H, E, B | H | 1, 2, 3, 4, 10, 11 | 0.47 |
| | | E | 5, 6, 12, 13, 14 | |
| | | B | 7, 8, 9, 15, 16 | |
| 3 | H, G, C | H | 1, 2, 3, 4, 10, 11 | 1.70 |
| | | G | 5, 6, 7, 8, 12, 13, 14 | |
| | | C | 9, 15, 16 | |
| 4 | H, G, D | H | 1, 2, 3, 4, 5, 6, 10, 11 | 3.09 |
| | | G | 7, 8, 9, 12, 13, 14, 15 | |
| | | D | 16 | |
| ... | ... | ... | ... | ... |

| CANDIDATE OF INSTALLATION LOCATION OF WIRELESS BASE STATION | NUMBER OF WIRELESS TERMINAL STATIONS HAVING VISIBILITY PRESENCE | WIRELESS TERMINAL STATION HAVING VISIBILITY PRESENCE | NUMBER OF WIRELESS TERMINAL STATIONS HAVING VISIBILITY ABSENCE | WIRELESS TERMINAL STATION HAVING TRANSMISSION SPEED EQUAL TO OR HIGHER THAN THRESHOLD AMONG WIRELESS TERMINAL STATIONS HAVING VISIBILITY ABSENCE | WIRELESS TERMINAL STATION HAVING TRANSMISSION SPEED LOWER THAN THRESHOLD AMONG WIRELESS TERMINAL STATIONS HAVING VISIBILITY ABSENCE |
|---|---|---|---|---|---|
| A | 5 | 1, 2, 3, 10, 11 | 11 | 4, 5, 12, 13, 14, 15, 16 | 6, 7, 8, 9 |
| B | 5 | 7, 8, 9, 15, 16 | 11 | 1, 2, 3, 4, 5, 6, 10, 11 | 12, 13, 14 |
| C | 3 | 9, 15, 16 | 13 | 8, 10, 11, 12, 13, 14 | 1, 2, 3, 4, 5, 6, 7 |
| D | 1 | 16 | 15 | 12, 13, 14, 15 | |
| E | 6 | 5, 6, 7, 12, 13, 14 | 10 | 8, 9, 10, 11, 15, 16 | 1, 2, 3, 4 |
| F | 7 | 3, 4, 5, 6, 11, 12, 13 | 9 | 1, 2, 10, 14, 15, 16 | 7, 8, 9 |
| G | 9 | 5, 6, 7, 8, 9, 12, 13, 14, 15 | 7 | 1, 2, 3, 4 | 10, 11, 16 |
| H | 9 | 1, 2, 3, 4, 5, 6, 10, 11, 12 | 7 | 7, 8, 9, 13, 14 | 15, 16 |
| ... | ... | ... | ... | ... | ... |

Fig. 14

| EVALUATION ORDER | COMBINATION OF CANDIDATES FOR INSTALLATION LOCATION OF WIRELESS BASE STATION |
|---|---|
| 1 | H, A |
| 1 | H, B |
| 1 | H, C |
| ⋮ | ⋮ |
| 2 | ... |
| ⋮ | ⋮ |

| EVALUATION ORDER | COMBINATION OF CANDIDATES FOR INSTALLATION LOCATION OF WIRELESS BASE STATION | SUM OF TRANSMISSION SPEED [Mbit/s] |
|---|---|---|
| 1 | H,A | 16,000 |
| 2 | H,B | 15,500 |
| 3 | H,C | 15,000 |
| ... | ... | ... |

STATION PLACEMENT DESIGNING METHOD, STATION PLACEMENT DESIGNING APPARATUS AND PROGRAM

CROSS-REFERENCE TO RELATED APPLICATIONS

This application is a 371 U.S. National Phase of International Application No. PCT/JP2020/001014 filed on Jan. 15, 2020, which claims priority to Japanese Application No. 2019-007230 filed on Jan. 18, 2019. The entire disclosures of the above applications are incorporated herein by reference.

TECHNICAL FIELD

The present invention relates to a station placement design method, a station placement design device, and a program.

BACKGROUND ART

A use case where radio waves in the millimeter radio wave band are used in a telecommunication infrastructure has been proposed in IEEE 802.11ay (Non Patent Literature 1). In addition, as a project for reviewing the use case, Telecom Infra Project (TIP) has been established (Non Patent Literature 2). Meanwhile, in monitoring a telecommunications infrastructure, reviews of technologies utilizing three-dimensional (3D) point group data have progressed (Non Patent Literature 3).

In the related art, there is a technology of designating installation locations of a plurality of wireless terminal stations and evaluating candidates for an installation location of a wireless base station. For example, the technology disclosed in Patent Literature 1 relates to a station placement design method of evaluating installation locations of wireless base stations using the amounts of propagation loss and error occurrence rates of the wireless base stations as parameters for minimizing the number of wireless base stations. In such a technology, it is necessary to designate candidates for an installation location of a wireless base station in advance.

In addition, in the related art, there is a technology for determining the presence/absence of visibility between a wireless base station and a wireless terminal station. For example, the technology disclosed in Patent Literature 2 determines the presence/absence of visibility between a first wireless station having an installation location designated in advance and a second wireless station facing the first wireless station.

CITATION LIST

Patent Literature

Patent Literature 1: JP 6377666 A
Patent Literature 2: JP 4295746 A

Non Patent Literature

Non Patent Literature 1: D. Tujkovic, et al., "Changes to IEEE 802.11 ay in support of mmW Distribution Network Use Cases", [online], Jul. 10, 2017, doc.: IEEE 802. 11-17/1022 rO, Djordje Tujkovic Facebook, [Retrieved Dec. 26, 2018], Internet <URL: https://mentor.ieee.org/802.11/dcn/17/11-17-1022-00-00ay-changes-to-ieee-802-11ay-in-support-of-mmw-mesh-network-use-cases.pptx>

Non Patent Literature 2: S. Sawhney, et al., "Millimeter Wave (mmWave) Networks", [online], Telecom Infra Project, [Retrieved Dec. 26, 2018], Internet <URL: https://telecominfraproject.com/mmwave/>

Non Patent Literature 3: "AI Supporting Human: B-10 Real world is built as database using space state estimation technology and 3D point group analysis technology promoting support for facility maintenance operation", [online], NTT R&D Forum 2017, [Retrieved Dec. 26, 2018], Internet <URL: http://www.ntt.co.jp/RD/active/201702/jp/pdf_jpn/02/B-10_j.pdf>

Non Patent Literature 4: "MetroLinq™ 2.5G 60 Beamforming Sector, Datasheet", [online], IgniteNet, [Retrieved Dec. 26, 2018], Internet <URL: https://www.ignitenet.com/downloads/datasheets/MetroLinq-2.5G-60-BF-sector-datasheet.pdf>

SUMMARY OF THE INVENTION

Technical Problem

In a case where the technology disclosed in Patent Literature 1 is applied to a wireless communication system that uses a communication method particularly requiring securement of visibility, in order to select optimal installation locations of wireless base stations, there is a problem in that a huge number of candidates for an installation location of a wireless base station need to be designated in advance, and an evaluation of each needs to be performed. In addition, in order to select optimal installation locations of wireless stations using the technology disclosed in Patent Literature 2, there is a problem in that all possible combinations of the wireless stations should be designated in advance, and each needs to be evaluated.

The present invention is in view of the technical background described above, and an object thereof is to provide a technology enabling easy selection of candidates for an optimal installation location of a wireless base station for a plurality of wireless terminal stations.

Means for Solving the Problem

According to one aspect of the present invention, a station placement design method is provided, which includes: extracting candidates for an installation location of a wireless base station from point group data in accordance with designated conditions for an installation location of a wireless base station; determining presence/absence of visibility between a plurality of designated wireless terminal stations and the candidates for an installation location of a wireless base station based on the point group data and generating a first list including information in which the candidates for an installation location of a wireless base station and wireless terminal stations determined to have presence of visibility for the candidates for an installation location of a wireless base station are associated with each other; generating a second list including information representing combinations of the candidates for an installation location of a wireless base station that enable all of the plurality of designated wireless terminal stations to be accommodated based on the first list; and sorting the second list in order from the smallest number of the candidates for an installation location of a wireless base station to the largest.

In addition, according to one aspect of the present invention, the station placement design method described above further includes estimating a transmission speed of a case where a communication system that is able to perform communication in a case where the visibility is absent for wireless terminal stations determined to have absence of visibility for the candidates for an installation location of a wireless base station is used and generating a third list including information in which the wireless terminal stations determined to have absence of visibility for which the estimated transmission speed is equal to or higher than a predetermined value and the candidates for an installation location of a wireless base station are associated with each other.

In addition, according to one aspect of the present invention, the station placement design method described above further includes: generating a fourth list including information representing combinations of the candidates for an installation location of a wireless base station that enable all the plurality of designated wireless terminal stations to be accommodated, which are a union set of the wireless terminal stations determined to have presence of the visibility and the wireless terminal stations determined to have absence of visibility for which the estimated transmission speed is equal to or higher than the predetermined value; and sorting the fourth list in order from the smallest number of the candidates for an installation location of a wireless base station to the largest.

In addition, according to one aspect of the present invention, the station placement design method described above further includes calculating a sum of values of the estimated transmission speeds of all the plurality of designated wireless terminal stations to be accommodated by wireless base stations that are based on the combinations of the candidates for an installation location of a wireless base station included in the fourth list and sorting the fourth list in order from the largest of the sum of values of the transmission speeds to the smallest.

In addition, according to one aspect of the present invention, the station placement design method described above further includes sorting the second list in order from the smallest deviation of the numbers of wireless terminal stations to be accommodated by the wireless base stations that are based on the candidates for an installation location of a wireless base station to the largest.

In addition, according to one aspect of the present invention, the station placement design method described above further includes adding the candidates for an installation location of a wireless base station such that all the wireless terminal stations determined to have presence of visibility for the candidates for an installation location of a wireless base station in the first list are capable to be accommodated by at least two or more wireless base stations among the wireless base stations based on the candidates for an installation location of a wireless base station.

Furthermore, according to another aspect of the present invention, a station placement design device is provided, which includes: a point group data extracting unit configured to extract candidates for an installation location of wireless base station from point group data in accordance with designated conditions for installation location of a wireless base station; and a list generating unit configured to determine presence/absence of visibility between a plurality of designated wireless terminal stations and the candidates for an installation location of a wireless base station based on the point group data, generate a first list including information in which the candidates for an installation location of a wireless base station and wireless terminal stations determined to have presence of visibility for the candidates for an installation location of a wireless base station are associated with each other, generate a second list including information representing combinations of the candidates for an installation location of a wireless base station that enable all the wireless terminal station to be accommodated based on the first list, and sort the second list in order from the smallest number of the candidates for an installation location of a wireless base station to the largest.

In addition, according to yet another aspect of the present invention, non-transitory computer-readable storage medium is provided which stores a program including instructions causing a computer to execute the station placement design method described above.

Effects of the Invention

According to the present invention, candidates for an installation location of a wireless base station that are optimal for a plurality of wireless terminal stations can be easily selected.

BRIEF DESCRIPTION OF DRAWINGS

FIG. 5 is a diagram illustrating an example of the configuration of a list L2 generated by the station placement design device 1 according to the first embodiment of the present invention.

FIG. 6 is a diagram illustrating an example of the configuration of a list L3 generated by the station placement design device 1 according to the first embodiment of the present invention.

FIG. 10 is a diagram illustrating an example of the configuration of a list L4 generated by a station placement design device 1 according to a second embodiment of the present invention.

FIG. 14 is a diagram illustrating an example of the configuration of a list L5 generated by the station placement design device 1 according to the third embodiment of the present invention.

FIG. 15 is a diagram illustrating an example of the configuration of a list L6 generated by the station placement design device 1 according to the third embodiment of the present invention.

FIG. 16 is a diagram illustrating an example of the configuration of a list L7 generated by the station placement design device 1 according to the third embodiment of the present invention.

DESCRIPTION OF EMBODIMENTS

First Embodiment

Hereinafter, a first embodiment of the present invention will be described with reference to the drawings.

Functional Configuration of Station Placement Design Device

Hereinafter, the functional configuration of a station placement design device 1 will be described.

Figure 1:
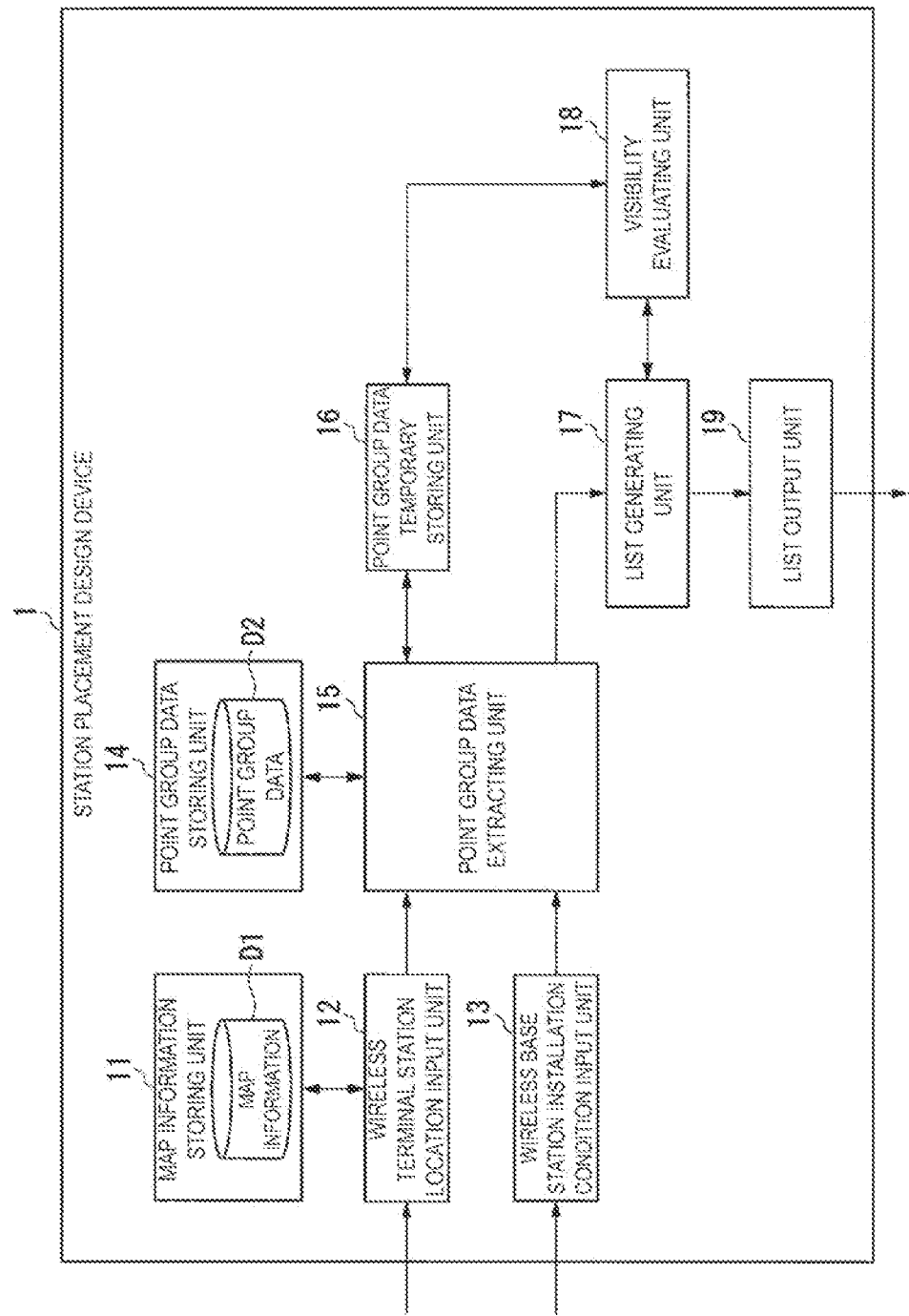
FIG. 1 is a block diagram illustrating the functional configuration of a station placement design device 1 according to a first embodiment of the present invention.

FIG. 1 is a block diagram illustrating the functional configuration of a station placement design device 1 according to a first embodiment of the present invention. The station placement design device 1 is a device that is used for selecting candidates for an installation location of a wireless base station optimal for a plurality of wireless terminal stations. The station placement design device 1 includes, for example, an information processing apparatus such as a general-purpose computer or the like.

As illustrated in FIG. 1, the station placement design device 1 includes a map information storing unit 11, a wireless terminal station location input unit 12, a wireless base station installation condition input unit 13, a point group data storing unit 14, a point group data extracting unit 15, a point group data temporary storing unit 16, a list generating unit 17, a visibility evaluating unit 18, and a list output unit 19.

The map information storing unit 11 stores map information D1 in advance. The map information storing unit 11 includes, for example, a storage medium such as a read only memory (ROM; read only memory), a random access memory (RAM; readable/writable memory), a flash memory, an electrically erasable programmable read only memory (EEPROM), or a hard disk drive (HDD) or any combination of such storage media. The map information D1 includes a database of information in which information identifying a building and location information indicating the location of the building (for example, address information, latitude/longitude, or the like) are associated with each other.

The wireless terminal station location input unit 12 designates installation locations of all the wireless terminal stations, which are set in advance, based on the map information D1. The wireless terminal station location input unit 12 inputs information indicating the installation locations of all the designated wireless terminal stations to the point group data extracting unit 15.

The wireless terminal station location input unit 12, for example, designates the installation locations of the wireless terminal stations using the following method.

Figure 2:
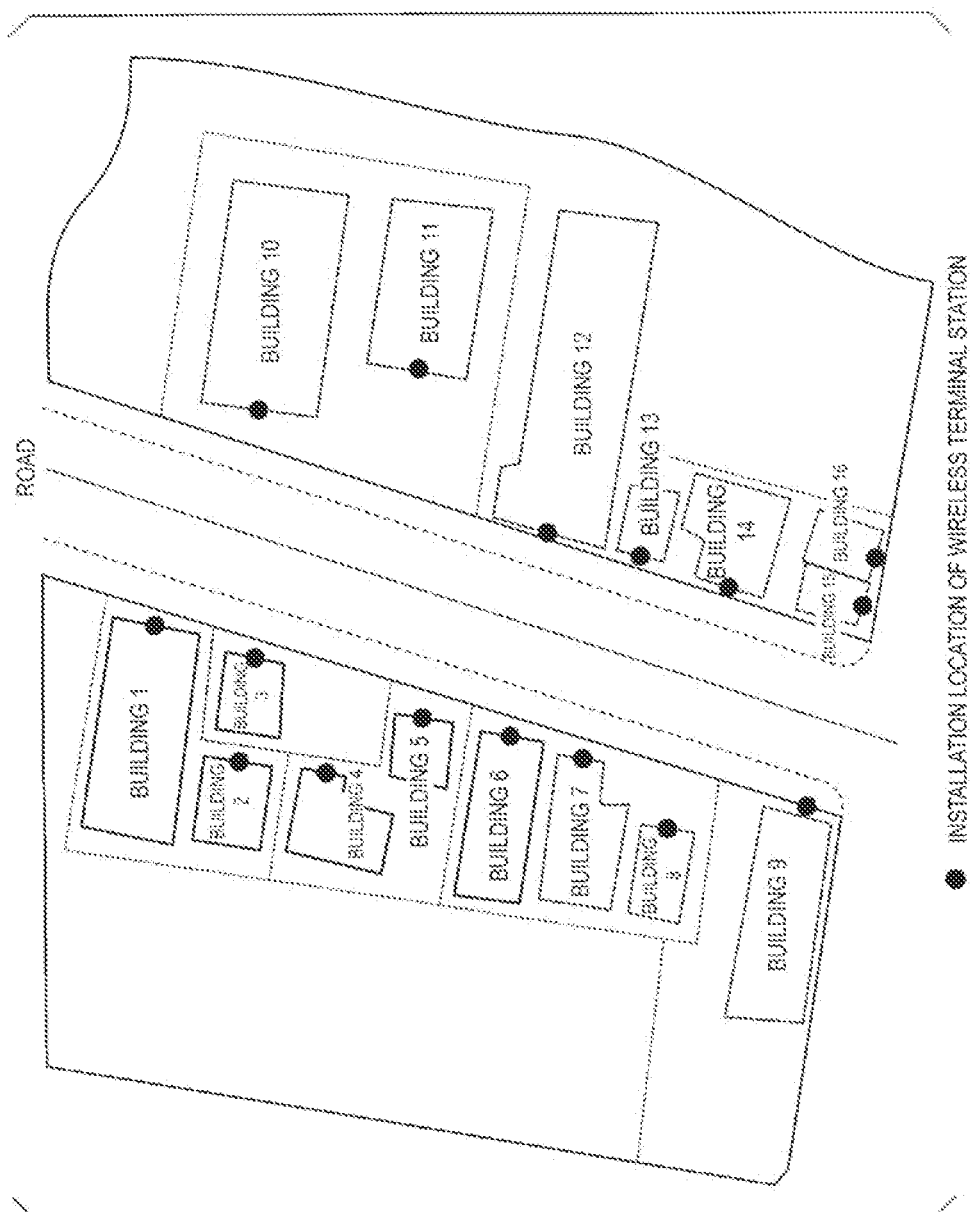
FIG. 2 is a diagram illustrating an example of a method for identifying installation locations of wireless terminal stations using the station placement design device 1 according to the first embodiment of the present invention.

FIG. 2 is a diagram illustrating an example of a method for designating installation locations of wireless terminal stations using the station placement design device 1 according to the first embodiment of the present invention. As illustrated in FIG. 2, the wireless terminal station location input unit 12, for example, cuts out a portion of a map based on the map information D1 and designates installation locations of the wireless terminal stations in accordance with a predetermined rule. The predetermined rule, for example, as illustrated in FIG. 2, may be a rule set in advance such as a rule that a center of a wall face of each building on a roadside is assumed to be an installation location of a wireless terminal station or the like. In the designation method described above, a two-dimensional map is used, and thus an installation location of a wireless terminal station in a height direction is not taken into account. In this case, heights of the installation locations of the wireless terminal stations, for example, may be set to a uniform value or values that are additionally designated individually.

The description will continue with reference back to FIG. 1.

The wireless base station installation condition input unit 13 designates conditions relating to the installation location of the wireless base station. The wireless base station installation condition input unit 13 inputs information indicating designated conditions relating to an installation location of a wireless base station to the point group data extracting unit 15.

In addition, the wireless base station installation condition input unit 13, for example, designates conditions relating to the installation location of the wireless base station using the following method.

Figure 3:
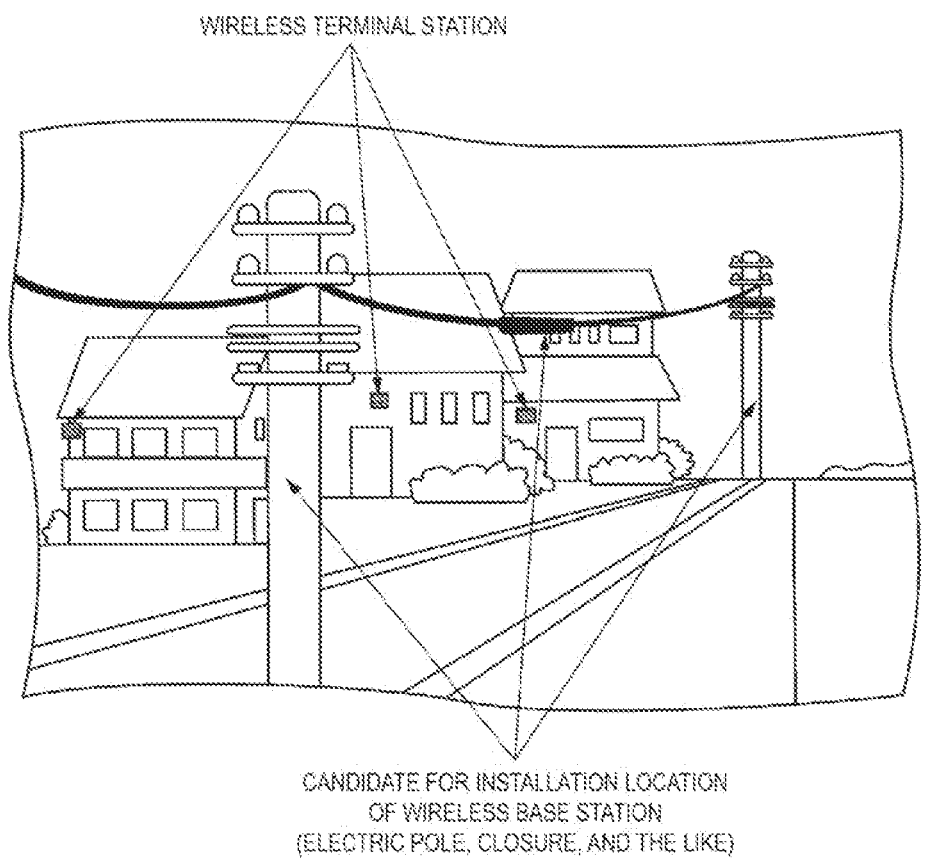
FIG. 3 is a diagram illustrating an example of a method for designating a condition relating to an installation location of wireless base station using the station placement design device 1 according to the first embodiment of the present invention.

FIG. 3 is a diagram illustrating an example of a method for designating a condition relating to an installation location of wireless base station using the station placement design device 1 according to the first embodiment of the present invention. As illustrated in FIG. 3, the wireless base station installation condition input unit 13, for example, designates a condition that an electrical pole and closures and the like attached to a wire are set as candidates for an installation location of a wireless base station. In addition, a designation method in which candidates for an installation location of a wireless base station are designated by being selected from a candidate list prepared in advance may be used.

The description will continue with reference back to FIG. 1.

The point group data storing unit 14 stores point group data D2 in advance. The point group data storing unit 14 includes, for example, a storage medium such as a RAM, a flash memory, an EEPROM, or an HDD or any combination of such storage media. The point group data D2 includes a database of point group data representing each point on a map.

The point group data extracting unit 15 acquires information indicating the installation location of all the wireless terminal stations input by the wireless terminal station location input unit 12. The point group data extracting unit 15 marks an installation location of each of the wireless terminal stations in the point group data D2 stored in the point group data storing unit 14 and extracts point group data of the vicinity of the installation location of each wireless terminal station from the point group data D2. The point group data extracting unit 15 stores the extracted point group data of the vicinity of the installation location of each of the extracted wireless terminal stations in the point group data temporary storing unit 16.

An extraction range of point group data may be set based on a condition set in advance. For example, by designating a distance of 200 meters in advance, point group data inside a sphere with a radius of 200 meters and the installation location of the wireless terminal station as its center may be extracted.

The point group data extracting unit 15 acquires information indicating conditions relating to an installation location of the wireless base station that is input by the wireless base station installation condition input unit 13. The point group data extracting unit 15 extracts and marks point group data of candidates for an installation location of a wireless base station from among point group data of the vicinity of the installation location of each wireless terminal station stored in the point group data temporary storing unit 16 in accordance with conditions relating to the installation location of the wireless base station. The point group data extracting unit 15 outputs information indicating candidates for an installation location of a wireless base station to the list generating unit 17.

In general, in a case where visibility is evaluated for all candidates for an installation location of a wireless base station that are visible from the installation location of each wireless terminal station, the amount of processing may be enormous. However, according to the station placement design device 1 of this embodiment, it is only necessary to evaluate visibility for only between the installation location of each wireless terminal station and each of candidates for an installation location of a wireless base station, which has been extracted in advance, and thus the amount of processing for the evaluation of visibility is reduced.

As described above, the point group data temporary storing unit 16 temporarily stores point group data of the vicinity of the installation location of each wireless terminal station output from the point group data extracting unit 15. The point group data storing unit 14 includes, for example, a storage medium such as a RAM, a flash memory, an EEPROM, or an HDD or any combination of such storage media.

The list generating unit 17 acquires information indicating candidates for an installation location of a wireless base station output from the point group data extracting unit 15. The list generating unit 17 generates a list L1 indicating a list of the candidates for an installation location of a wireless base station based on the acquired information. The list generating unit 17 outputs the generated list L1 to the visibility evaluating unit 18.

Figure 4:
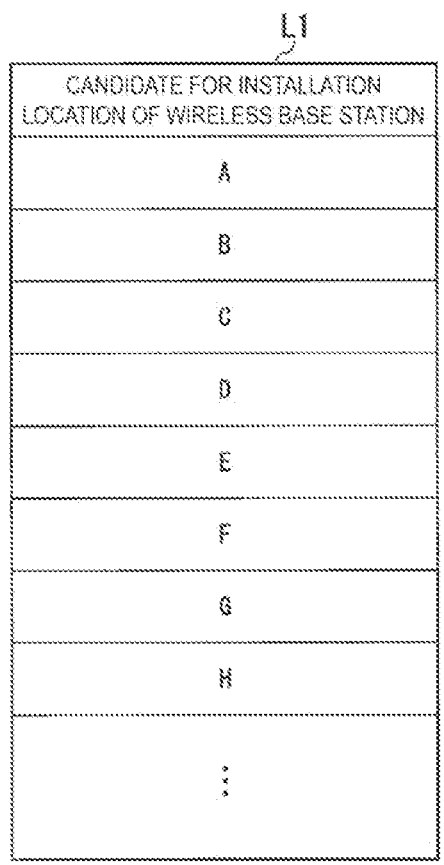
FIG. 4 is a diagram illustrating an example of the configuration of a list L1 generated by the station placement design device 1 according to the first embodiment of the present invention.

FIG. 4 is a diagram illustrating an example of the configuration of a list L1 generated by the station placement design device 1 according to the first embodiment of the present invention.

The visibility evaluating unit 18 acquires the list L1 output from the list generating unit 17. The visibility evaluating unit 18 refers to point group data of the vicinity of the installation location of each wireless terminal station stored in the point group data temporary storing unit 16 and evaluates whether or not visibility can be secured between the all candidates for an installation location of a wireless base station included in the list L1 and each wireless terminal station. The visibility evaluating unit 18 outputs information indicating evaluation results acquired in the evaluation of visibility described above to the list generating unit 17.

For example, the visibility evaluating unit 18 evaluates visibility by checking presence/absence of a blocking object between points (point group data) marked as installation locations of the wireless terminal station and points (point group data) marked as candidates for an installation location of a wireless base station. In other words, the visibility evaluating unit 18 evaluates visibility presence in a case where it is determined that the visibility can be secured (in other words, in a case where no blocking object is present) and evaluates visibility absence in a case where it is determined that the visibility cannot be secured (in other words, in a case where a blocking object is present).

The list generating unit 17 acquires information representing an evaluation result of the visibility evaluation output from the visibility evaluating unit 18. The list generating unit 17 generates a list L2 based on the acquired information and the list L1 illustrated in FIG. 4.

FIG. 5 is a diagram illustrating an example of the configuration of the list L2 generated by the station placement design device 1 according to the first embodiment of the present invention. As illustrated in FIG. 5, the list L2 is data in which six items: "evaluation order", "candidate for installation location of wireless base station", "number of wireless terminal stations having visibility presence", "wireless terminal station having visibility presence", "number of wireless terminal stations having visibility absence", and "wireless terminal station having visibility absence" are associated with each other.

A value of "evaluation order" represents a value ranked in order from a largest value to a smallest value of "number of wireless terminal stations having visibility presence".

A value of "candidate for installation location of wireless base station" represents information used for identifying the candidate for the installation location of the wireless base station.

A value of "number of wireless terminal stations having visibility presence" represents the number of wireless terminal stations for which visibility from each candidate for the installation location of the wireless base station is secured among all the wireless terminal stations (installation locations thereof).

"Wireless terminal station having visibility presence" represents information used for identifying a wireless terminal station for which visibility from each candidate for the installation location of the wireless base station is secured.

A value of "number of wireless terminal stations having visibility absence" represents the number of wireless terminal stations for which visibility from each candidate for the installation location of the wireless base station is not secured among all the wireless terminal stations (installation locations thereof).

"Wireless terminal station having visibility absence" represents information used for identifying a wireless terminal station for which visibility from each candidate for the installation location of the wireless base station is not secured.

As illustrated in FIG. 5, in the list L2, "candidate for installation location of wireless base station" is sorted in order from the largest value of "number of wireless terminal stations having visibility presence" to the smallest. This can makes it easy to perform evaluation of each candidate for the installation location of the wireless base station based on presence/absence of visibility between the installation location of each wireless terminal station designated in advance and the candidate for the installation location of the wireless base station.

Next, the list generating unit 17 identifies all of combination patterns of candidates for an installation location of a wireless base station satisfying the following condition, in other words, all the combination patterns of candidates for an installation location of a wireless base station that can accommodate all the wireless terminal stations. The condition is that all the installation locations of the wireless terminal stations each have secured visibility for at least one candidate for installation location of the wireless base station based on the list L2 described above. The list generating unit 17 generates a list L3 that is a list of an identified combination pattern of candidates for an installation location of a wireless base station. The list generating unit 17 outputs the generated list L3 to the list output unit 19.

Figure 8:
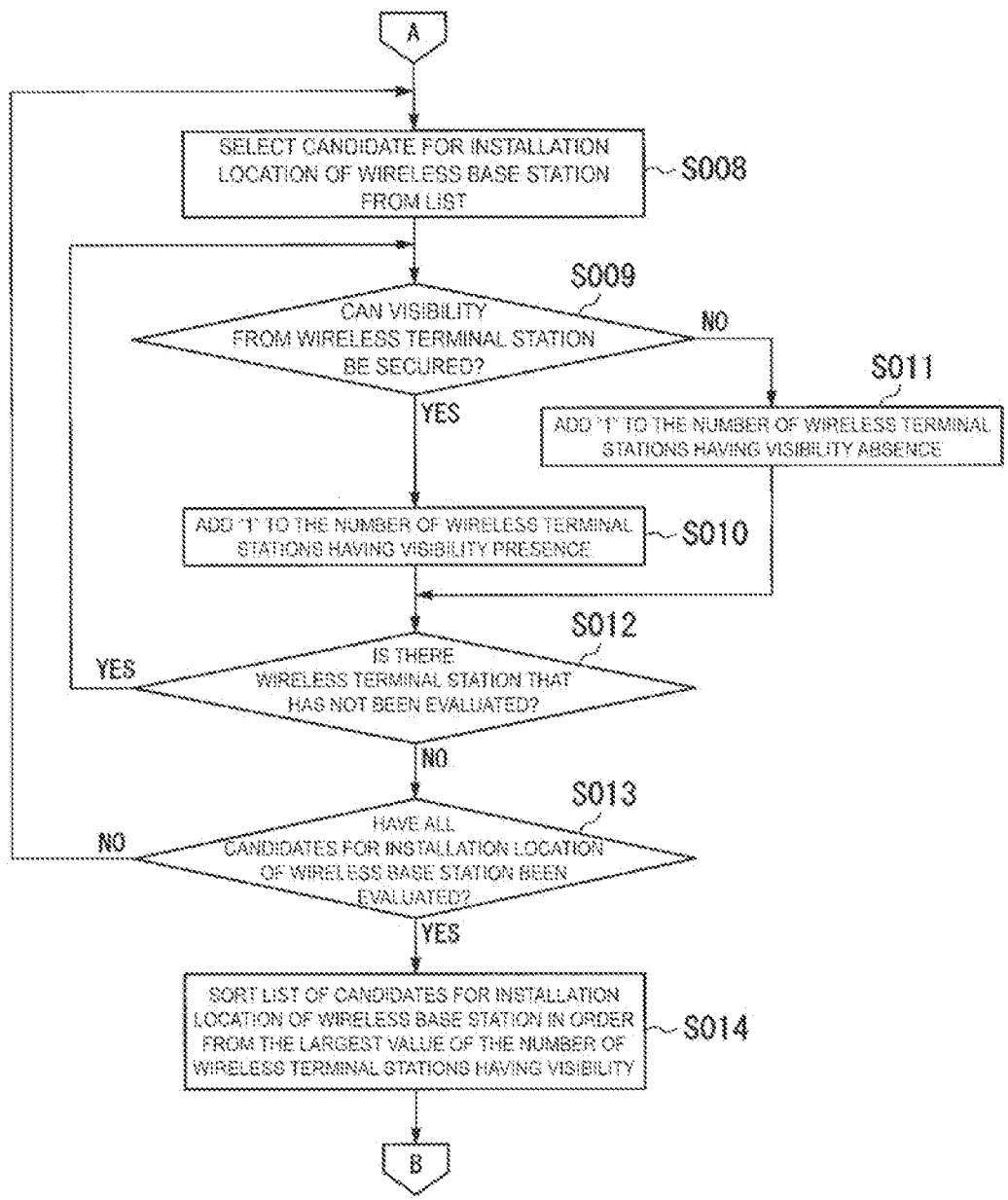
FIG. 8 is a flowchart illustrating an operation of the station placement design device 1 according to the first embodiment of the present invention.

FIG. 6 is a diagram illustrating an example of the configuration of the list L3 generated by the station placement design device 1 according to the first embodiment of the present invention. As illustrated in FIG. 6, the list L3 is data in which the items "evaluation order" and "combination of candidates for an installation location of a wireless base station" are associated with each other. As illustrated in FIG. 8, the list L3 is sorted in order from the smallest number of candidates for an installation location of a wireless base station included in the "combination of candidates for an installation location of a wireless base station" to the largest. A value of "evaluation order" represents a value ranked in order from the smallest value of the number to the largest.

The list output unit 19 acquires the list L3 output from the list generating unit 17. The list output unit 19 outputs the acquired list L3 to an external device. In addition, the list output unit 19 may output the list L3, for example, to a display unit (not illustrated in the drawing) such as a display included in the station placement design device 1.

Operation of Station Placement Design Device

Hereinafter, an example of the operation of the station placement design device 1 will be described.

Figure 7:
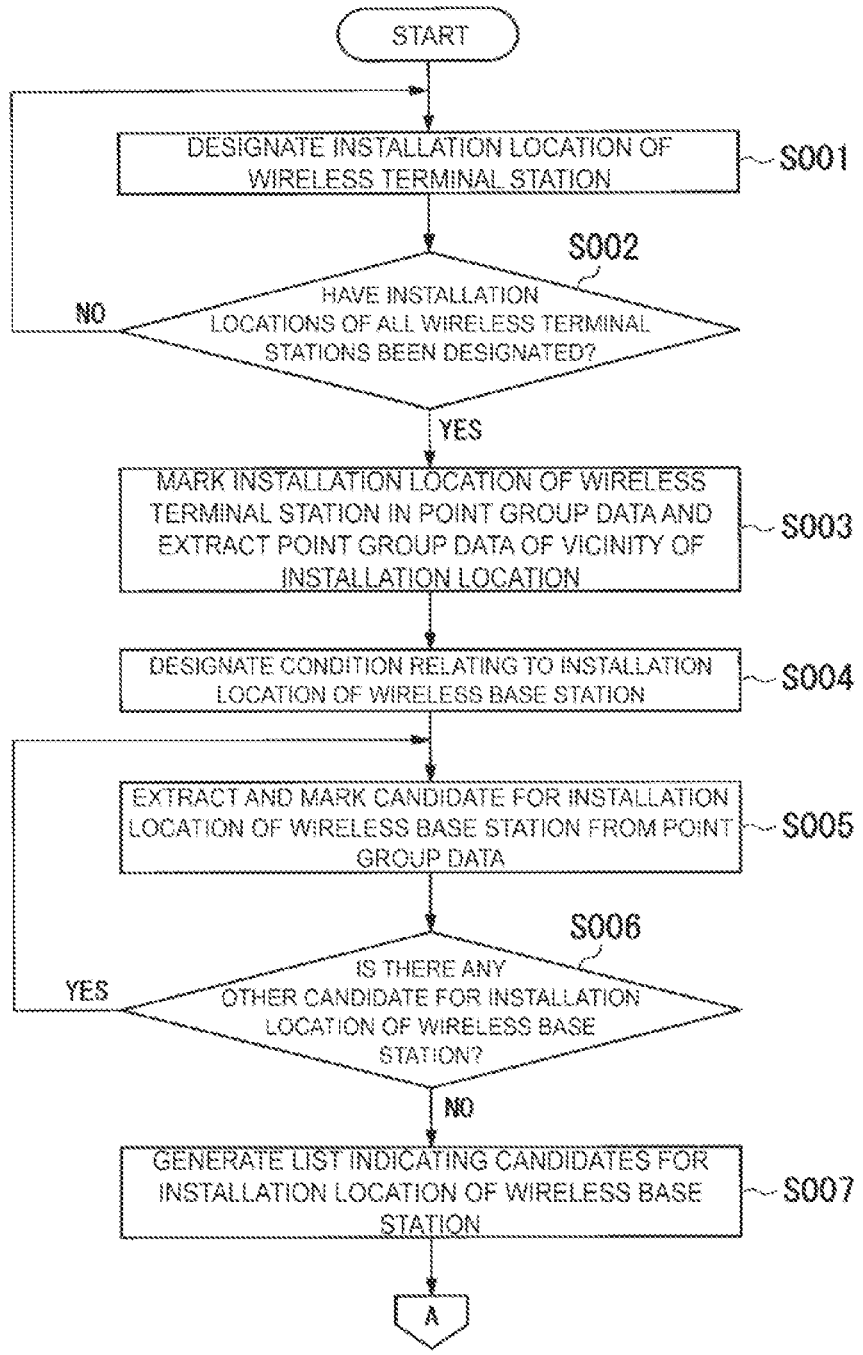
FIG. 7 is a flowchart illustrating an operation of the station placement design device 1 according to the first embodiment of the present invention.
Figure 9:
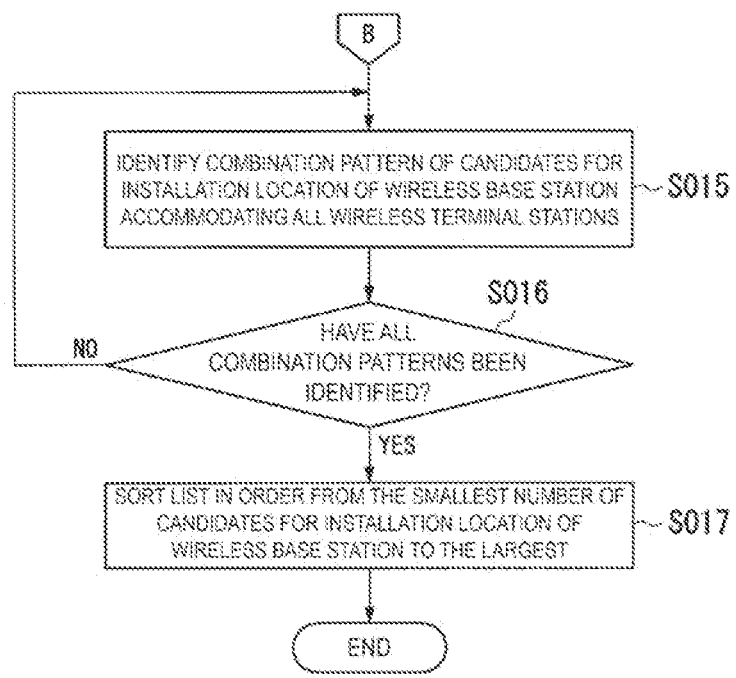
FIG. 9 is a flowchart illustrating an operation of the station placement design device 1 according to the first embodiment of the present invention.

FIGS. 7 to 9 are flowcharts illustrating the operation of the station placement design device 1 according to the first embodiment of the present invention.

First, the description will refer to FIG. 7.

The wireless terminal station location input unit 12 designates an installation location of a wireless terminal station set in advance based on the map information D1 (step S001). In a case where a wireless terminal station for which an installation location has not been designated is present (step S002: No), the wireless terminal station location input unit 12 continues to designate the installation location of the wireless terminal station (step S001).

In a case where installation locations of all the wireless stations are designated (step S002: No), the point group data extracting unit 15 marks the installation location of each of the wireless terminal stations in the point group data D2 stored in the point group data storing unit 14 and extracts point group data of the vicinity of the installation location of each of the wireless terminal stations from the point group data D2 (step S003). The point group data extracting unit 15 stores the extracted point group data of the vicinity of the installation location of each of the extracted wireless terminal stations in the point group data temporary storing unit 16.

The wireless base station installation condition input unit 13 designates a condition relating to the installation location of the wireless base station (step S004). The point group data extracting unit 15 acquires information indicating a condition relating to the installation location of the wireless base station that has been input by the wireless base station installation condition input unit 13. The point group data extracting unit 15 extracts and marks point group data that becomes candidates for an installation location of a wireless base station from point group data of the vicinity of the installation location of the wireless terminal station stored in the point group data temporary storing unit 16 in accordance with the condition relating to the installation location of the wireless base station (step S005).

In a case where there is another candidate for the installation location of the wireless base station (step S006: Yes), the point group data extracting unit 15 continues to extract and mark point group data that becomes the candidate for the installation location of the wireless base station (step S005). In a case where there is no other candidate for the installation location of the wireless base station (step S006: No), the list generating unit 17 generates a list L1 indicating a list of candidates for an installation location of a wireless base station based on the information indicating candidates for an installation location of a wireless base station output from the point group data extracting unit 15 (step S007).

Next, the description will refer to FIG. 8.

The visibility evaluating unit 18 selects one candidate for the installation location of the wireless base station from the list L1 acquired from the list generating unit 17 (step S008). The visibility evaluating unit 18 refers to the point group data of the vicinity of the installation location of the wireless terminal station stored in the point group data temporary storing unit 16 and evaluates whether or not visibility can be secured between the selected candidate for the installation location of the wireless base station and the wireless terminal station. In a case where the visibility can be secured (step S009: Yes), the visibility evaluating unit 18 adds "1" to a value corresponding to "number of wireless terminal stations having visibility presence" of the list L2 described above (step S010). In a case where the visibility can be secured (step S009: No), the visibility evaluating unit 18 adds "1" to a value corresponding to the "number of wireless terminal stations having visibility absence" of the list L2 described above (step S011).

In a case where there is a wireless terminal station that has not been evaluated (Step S012: No), the visibility evaluating unit 18 continues to evaluate whether or not visibility can be secured between the selected candidate for the installation location of the wireless base station and the wireless terminal station (step S009). In a case where there is no wireless terminal station that has not been evaluated (step S012: Yes), the visibility evaluating unit 18 checks whether or not all the candidates for an installation location of a wireless base station have been evaluated.

In a case where there is a candidate for the installation location of the wireless base station that has not been evaluated (step S013: No), the visibility evaluating unit 18 continues by selecting one candidate for the installation location of the wireless base station from the list L1 (step S008). In a case where all the candidates for an installation location of a wireless base station have been evaluated (steps S013: Yes), the list generating unit 17 generates a list L2 based on the information indicating the evaluation results of the evaluations of the visibility acquired from the visibility evaluating unit 18 and the list L1. Then, the list generating unit 17 sorts the list L2, which is a list of candidates for an installation location of a wireless base station, in order from the largest value of "number of wireless terminal stations having visibility presence" to the smallest (step S014).

Next, the description will refer to FIG. 9.

The list generating unit 17 identifies combination patterns of candidates for an installation location of a wireless base station that can accommodate all the wireless terminal stations based on the list L2 described above (step S015). In a case where there is a combination pattern that has not been identified (step S016: No), the list generating unit 17 continues to identify a combination pattern of candidates for an installation location of a wireless base station that can accommodate all the wireless terminal stations (step S015). In a case where all the combination patterns are identified (step S016: Yes), the list generating unit 17 generates a list L3 which is a list of the identified combination patterns of the candidates for an installation location of a wireless base station and sorts the list L3 in order from the smallest number of candidates for an installation location of a wireless base station that can be combined to accommodate all the wireless terminal stations to the largest (step S017).

Then, the list output unit 19 acquires the list L3 from the list generating unit 17, and outputs the list L3. With this, the operations of the station placement design device 1 represented in the flowcharts illustrated in FIGS. 7 to 9 end.

As described above, the station placement design device 1 according to the first embodiment of the present invention can output a list of combination patterns of candidates for an installation location of a wireless base station, which is sorted in order from the smallest number of candidates for an installation location of wireless base station that can be combined to accommodate all the wireless terminal stations to the largest. In this way, the station placement design device 1 according to the first embodiment of the present invention can present combination patterns of candidates for an installation location of a wireless base station that enable all the wireless terminal stations to be accommodated by a smaller number of wireless base stations.

Second Embodiment

Hereinafter, a second embodiment of the present invention will be described with reference to the drawings.

In the first embodiment described above, the list generating unit 17 of the station placement design device 1 outputs the list L3 sorted in order from the smallest number of candidates for an installation location of a wireless base station to the largest that can be combined to accommodate all the wireless terminal stations to the list output unit 19 and ends the process.

However, as in the list L3 illustrated as an example in FIG. 6, there are cases where there are a plurality of combination patterns (of candidates for an installation location of a wireless base station) for which the evaluation orders are ranked the same. For example, in the list L6 illustrated in FIG. 6, a smallest number of candidates for an installation location of a wireless base station that can be combined to accommodate all the wireless terminal stations is three. As combination patterns in which the number of candidates is three, there are four combinations of patterns of [H, G, B], [H, G, C], [H, G, D], and [H, E, B], and an evaluation order of a first rank is given to all these four combination patterns.

Meanwhile, in a wireless communication system, radio waves are finite resources and are shared and used among a plurality of wireless terminal stations. For this reason, in a case where there is a wireless base station in which the number of wireless terminal stations to be accommodated is large and a wireless base station in which the number of wireless terminal stations to be accommodated is large, there are cases where a deviation occurs in resources that can be used by the wireless terminal stations. Thus, from the point of view of fairness and the like, it is preferable that a deviation of the numbers of wireless terminal stations accommodated by wireless base stations be decreased.

A list generating unit 17 according to a second embodiment evaluates a deviation of the numbers of wireless terminal stations accommodated by candidates for an installation location of a wireless base station. In the list L2 illustrated in FIG. 5, for candidates "H" and "G" for an installation location of a wireless base station, all the wireless terminal stations "5", "6", and "12" are wireless terminal stations having visibility presence. Thus, as long as a wireless base station is based on any of the candidates "H" and "G" for an installation location of a wireless base station, the wireless base station can accommodate wireless terminal stations "5", "6", and "12". In such a case, there are a plurality of patterns in assignment of wireless terminal stations accommodated by each wireless base station, and a pattern can be selected from among the plurality of patterns.

In the second embodiment, each standard deviation of the numbers of wireless terminal stations accommodated by each wireless base station is calculated while the pattern of assignment of wireless terminal stations accommodated by each wireless base station is changed. Then, the list generating unit 17 identifies a pattern of assignment for which the calculated standard deviation is the smallest.

FIG. 10 is a diagram illustrating an example of the configuration of a list L4 generated by a station placement design device 1 according to the second embodiment of the present invention. The list generating unit 17 according to the second embodiment re-evaluates the combination patterns of the candidates for an installation location of a wireless base station for which evaluation orders are ranked the same in a list L3 illustrated in FIG. 6 based on the calculation result of the standard deviation described above. Then, the list generating unit 17 acquires a list L4, for example, as illustrated in FIG. 10 by performing re-ranking based on the result of the re-evaluation.

As described above, in the list L3 illustrated in FIG. 6, there are four combination patterns of which evaluation orders are the first rank. On the other hand, as illustrated in FIG. 10, the list generating unit 17 according to the second embodiment can further rank these four combination patterns by taking the number of wireless terminal stations accommodated in each wireless base station into account.

For example, as illustrated in FIG. 10, in a case where a combination of candidates for an installation location of a wireless base station is [H, G, B], the numbers of wireless terminal stations accommodated by the wireless base stations corresponding to "H", "G", and "B" can be respectively set to six, five, and five. On the other hand, in a case where a combination of candidates for an installation location of a wireless base station is [H, G, C], the numbers of wireless terminal stations accommodated by the wireless base stations corresponding to "H", "G", and "C" are respectively six, seven, and three even in a case where the deviation is minimized. In this way, in a case where the combination of the candidates for an installation location of a wireless base station is [H, G, B] and in a case where the combination is [H, G, C], the standard deviations are respectively "0.47" and "1.70" being mutually-different values.

In this way, even in a case where there are a plurality of patterns in which the numbers of candidates for an installation location of a wireless base station that can be combined to accommodate all the wireless terminal stations are the same, the station placement design device 1 according to the second embodiment, by taking a deviation of the numbers of wireless terminal stations accommodated by the wireless base stations into account, can present a more appropriate combination pattern of the candidates for an installation location of a wireless base station.

Operation of List Generating Unit

Hereinafter, an example of an operation of the list generating unit 17 according to the second embodiment will be described.

Figure 11:
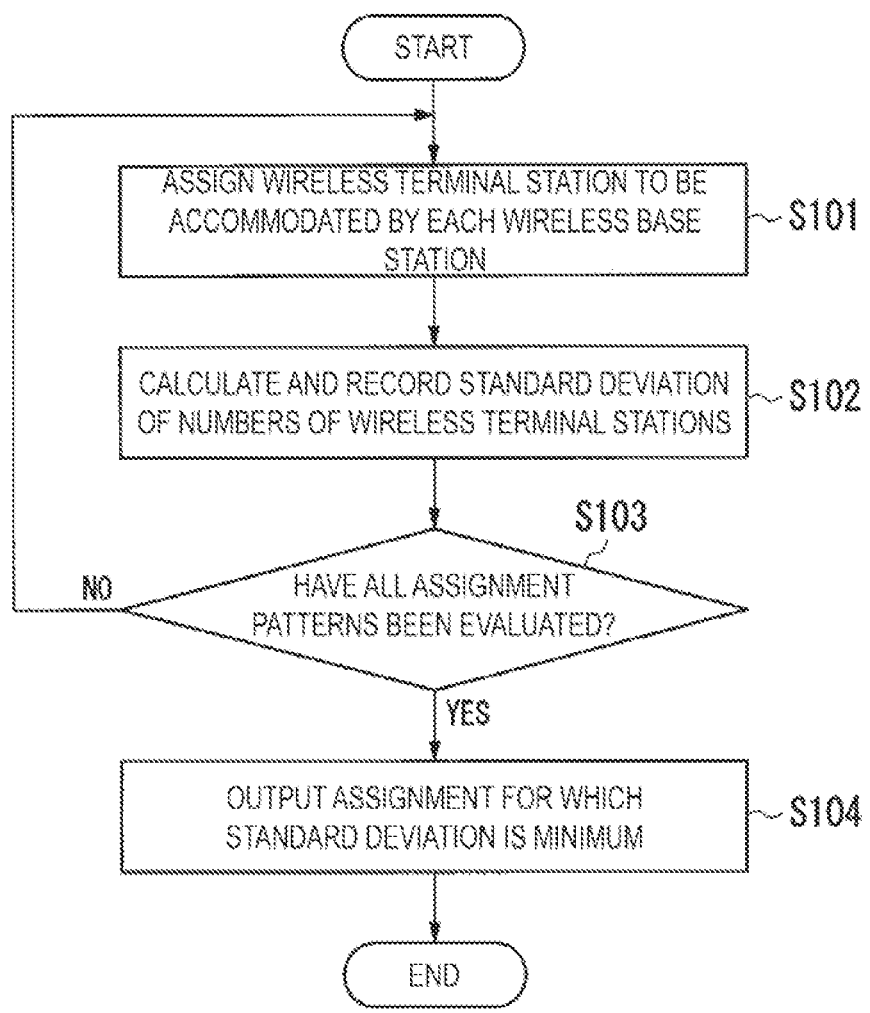
FIG. 11 is a flowchart illustrating an operation of a list generating unit 17 of the station placement design device 1 according to the second embodiment.

FIG. 11 is a flowchart illustrating the operation of the list generating unit 17 of the station placement design device 1 according to the second embodiment. The operation of the list generating unit 17 represented in this flowchart starts when the operation of the station placement design device 1 according to the first embodiment for which flowcharts are illustrated in FIGS. 7 to 9 ends.

The list generating unit 17 selects one combination pattern of candidates for an installation location of a wireless base station which is included in the list L3 illustrated in FIG. 6. The list generating unit 17 assigns wireless terminal stations to be accommodated by each candidate for the installation location of each wireless base station included in the selected combination pattern (step S101).

The list generating unit 17 calculates and records a standard deviation of the numbers of wireless terminal stations assigned to each candidates for an installation location of a wireless base station (step S102). In a case where there is an assigned pattern that has not been evaluated (in other words, for which a deviation has not been calculated) (Step S103: No), the list generating unit 17 evaluates the assigned pattern that has not been evaluated (steps S101 to S102). In a case where all the assigned patterns have been evaluated (step S103: Yes), the list generating unit 17 outputs an assigned pattern for which the value of the standard deviation is a minimum (step S104).

As above, the operation of the list generating unit 17 represented in the flowchart illustrated in FIG. 11 ends. The operations described above are performed for each combination pattern of candidates for an installation location of a wireless base station included in the list L3 illustrated in FIG. 6.

Third Embodiment

Hereinafter, a third embodiment of the present invention will be described with reference to the drawings. First, the entire configuration of a communication system assumed in the third embodiment will be described.

Figure 12:
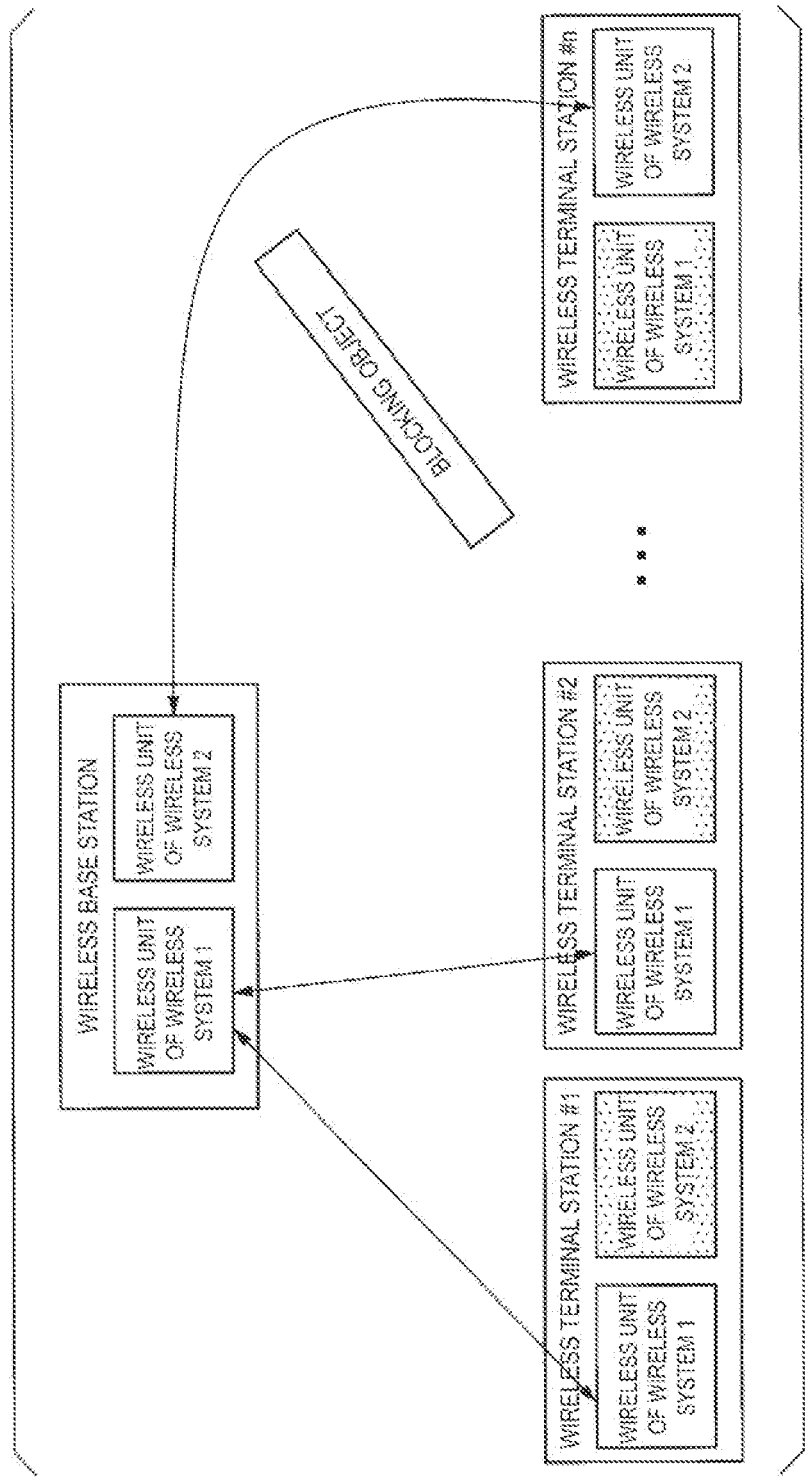
FIG. 12 is a diagram illustrating an example of the entire configuration of a communication system according to a third embodiment of the present invention.

FIG. 12 is a diagram illustrating an example of the entire configuration of a communication system according to the third embodiment of the present invention.

As illustrated in FIG. 12, the communication system assumed in this embodiment is a communication system that is able to select and use a wireless system 1, for example, using radio waves of a 60 GHz band, and a wireless system 2, for example, using radio waves of a 5 GHz band. The wireless system 1 is a communication system in which a communication speed is high, and securement of visibility between a wireless base station and a wireless terminal station is necessary. On the other hand, the wireless system 2 is a communication system in which a communication speed is low, and securement of visibility between a wireless base station and a wireless terminal station is unnecessary. As a product that realizes such a communication system, for example, there is a product disclosed in Non Patent Literature 4.

According to the communication system as described above, a wireless service can be provided for all the buildings in which terminal station devices are installed by using the wireless system 1 in a case where visibility between the wireless base station and the wireless terminal station is present and by using the wireless system 2 in a case where there is no visibility between the wireless base station and the wireless terminal station.

However, in wireless communication, in general, electric power at the time of reception further attenuates as a transmission distance becomes longer, and a technology for adaptive modulation according to electric power is employed in a wireless technology, for example, standardized in IEEE 802.11. Thus, even when conditions relating to presence/absence of visibility between a wireless base station and a wireless terminal station are the same, there are cases where a communicable transmission speed is different in accordance with a transmission distance.

Functional Configuration of Station Placement Design Device

Figure 13:
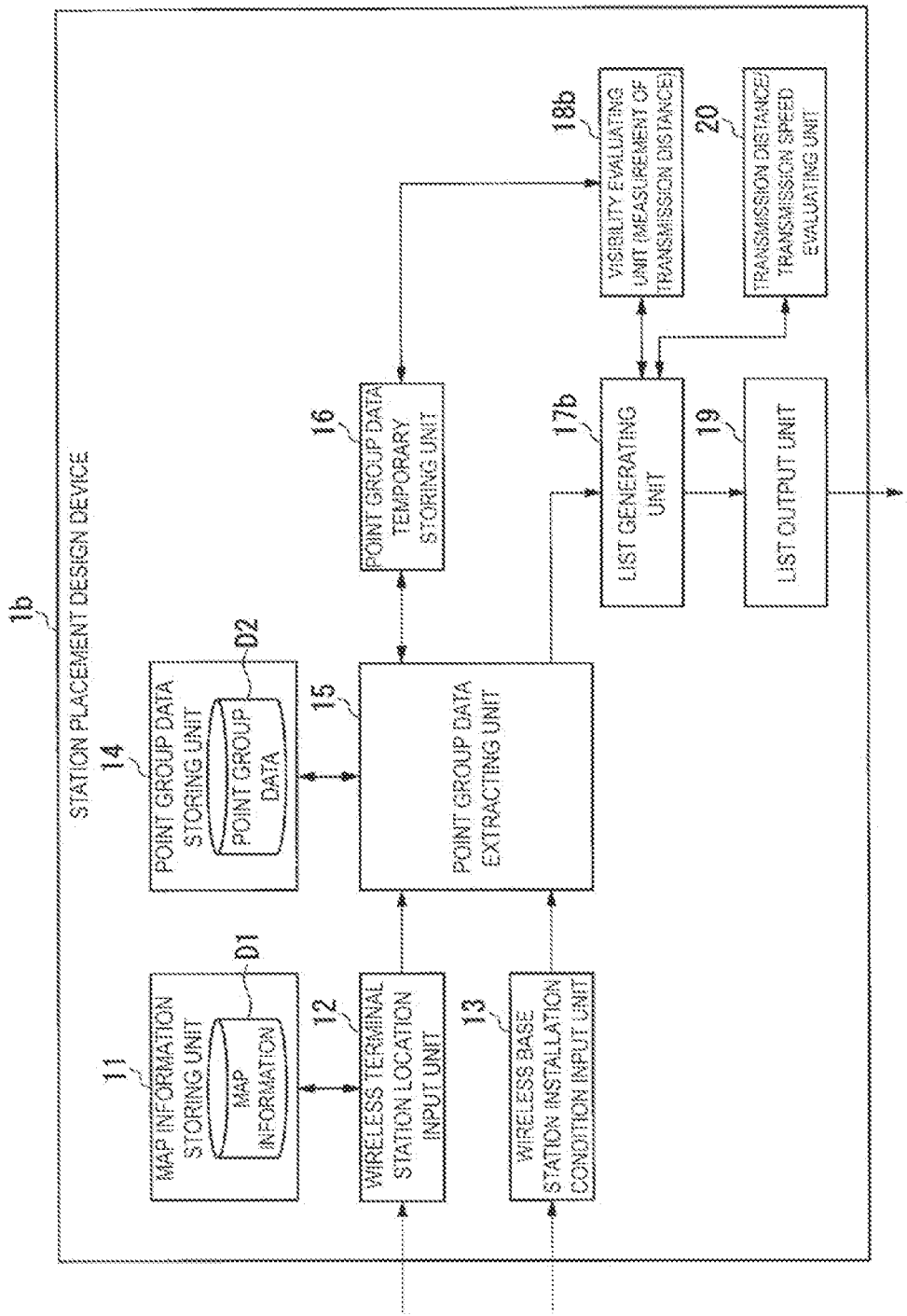
FIG. 13 is a block diagram illustrating the functional configuration of a station placement design device 1b according to the third embodiment of the present invention.

Hereinafter, the functional configuration of a station placement design device 1b that performs station placement design for the communication system described above will be described. FIG. 13 is a block diagram illustrating the functional configuration of the station placement design device 1b according to the third embodiment of the present invention.

As different points of the functional configuration of the station placement design device 1b from that of the station placement design device 1 according to the first embodiment illustrated in FIG. 1, the functions of the list generating unit 17 (17b) and the visibility evaluating unit 18 (18b) are different, and a transmission distance/transmission speed evaluating unit 20 is newly added. The same names and the same reference signs are assigned to functional units having the same function as the functional units included in the station placement design device 1 according to the first embodiment, and description thereof will be omitted.

The visibility evaluating unit 18b performs measurement of a transmission distance between candidates for an installation location of a wireless base station and an installation location of a wireless terminal station together with an evaluation of visibility. In a case where a result of the evaluation of visibility is visibility presence, the visibility evaluating unit 18b outputs the evaluation result indicating the visibility presence to a list generating unit 17b. In a case where a result of the evaluation of visibility is visibility absence, the visibility evaluating unit 18b outputs information that represents a result of measurement of a transmission distance to the list generating unit 17b.

In a case where the information representing the result of the measurement of the transmission distance output from the visibility evaluating unit 18b is acquired, the list generating unit 17b outputs information representing the result of the measurement of the transmission distance to the transmission distance/transmission speed evaluating unit 20.

The transmission distance/transmission speed evaluating unit 20 acquires the information representing the result of the measurement of the transmission distance output from the list generating unit 17b. The transmission distance/transmission speed evaluating unit 20 calculates (estimates)

a communicable transmission speed for the transmission distance based on the acquired information. Then, the transmission distance/transmission speed evaluating unit 20 selects wireless terminal stations for which the calculated transmission speed is equal to or higher than a predetermined threshold (or smaller than the predetermined threshold). The transmission distance/transmission speed evaluating unit 20 outputs information indicating wireless terminal stations having a transmission speed to be equal to or higher than the threshold, the transmission speed, and wireless terminal stations having a transmission speed to be lower than the threshold to the list generating unit 17.

The list generating unit 17b generates a list L5, for example, illustrated in FIG. 14 based on the information acquired from the visibility evaluating unit 18b and the transmission distance/transmission speed evaluating unit 20.

FIG. 14 is a diagram illustrating an example of the configuration of the list L5 generated by the station placement design device 1 according to the third embodiment of the present invention. As illustrated in FIG. 14, the list generating unit 17b generates the list L5 (a third list) in which wireless terminal stations for which a result of evaluation of visibility is visibility presence, wireless terminal stations having a transmission speed equal to or higher than a threshold among wireless terminal stations for which a result of evaluation of visibility is visibility absence, and wireless terminal stations having a transmission speed lower than the threshold among the wireless terminal stations for which a result of evaluation of visibility is visibility absence are represented.

Next, the list generating unit 17b determines that the wireless terminal stations having a transmission speed is lower than the threshold among the wireless terminal stations for which the result of evaluation of visibility is visibility absence are wireless terminal stations that cannot be accommodated by the wireless base station. Then, the list generating unit 17b generates a list L6 (a fourth list) that is a list of combination patterns of candidates for an installation location of a wireless base station based on the results of the determination and the like. In other words, the list L6 represents combinations of candidates for an installation location of a wireless base station that can accommodate all the wireless terminal stations that are a union set of wireless terminal stations determined to have visibility presence and wireless terminal stations having a calculated (estimated) transmission speed equal to or higher than a predetermined threshold. FIG. 15 is a diagram illustrating an example of the configuration of the list L6 generated by the station placement design device 1 according to the third embodiment of the present invention.

The list generating unit 17b identifies a transmission speed of each of wireless terminal stations included in each combination pattern included in the generated list L6 based on the information, which represents the transmission speed, acquired from the transmission distance/transmission speed evaluating unit 20. Then, the list generating unit 17b calculates a sum of transmission speeds of combination patterns included in the generated list L6 and generates a list L7.

FIG. 16 is a diagram illustrating an example of the configuration of a list L7 generated by the station placement design device 1 according to the third embodiment of the present invention. As illustrated in FIG. 16, in the list L7, evaluation orders can be ranked in order from the largest value of the sum of transmission speeds to the smallest.

In this way, the station placement design device b1 according to the third embodiment can evaluate candidates for an installation location of a wireless base station based on the transmission speed of the entire communication system.

Fourth Embodiment

Hereinafter, a fourth embodiment of the present invention will be described with reference to the drawings.

A communication system assumed in this embodiment is a communication system that switches a wireless base station to which a wireless terminal station is communicatively connected to another wireless base station, for example, in a case where a failure occurs in the wireless base station. Thus, in this embodiment, candidates for an installation location of a wireless base station need to be selected such that all the wireless terminal stations can be accommodated by at least two wireless base stations.

For example, a case where an evaluation is performed on a combination pattern of [H, G, B] illustrated in FIG. 6 will be considered. Wireless terminal stations "5", "6", and "12" are wireless terminal stations that can be accommodated by any one of "H" and "G" that are candidates for an installation location of a wireless base station. In addition, wireless terminal stations "7", "8", "9", and "15" are wireless terminal stations that can be accommodated in any one of "G" and "B" that are candidates for an installation location of a wireless base station. On the other hand, wireless terminal stations "1", "2", "3", "4", "10", "11", "13", "14", and "16" are wireless terminal stations that can be accommodated by only one of "H", "G", and "B" that are candidates for an installation location of a wireless base station.

In this case, a list generating unit 17 adds other candidates for an installation location of a wireless base station (in other words, wireless base stations other than [H], [G], and [B]) that can accommodate the wireless terminal stations described above that can be accommodated by only one of the candidates to the combination patterns described above. In accordance with this, all the wireless terminal stations can be accommodated by at least two wireless base stations. For example, in the case of the example described above, for example, combination patterns of [H, G, B, F, A, C, E] are formed by adding "F", "A", "C", and "E" that are candidates for an installation location of a wireless base station, and thus, each of all the wireless terminal stations is a wireless terminal station that can be accommodated by at least two wireless base stations.

Operation of List Generating Unit

Hereinafter, an example of the operation of the list generating unit 17 according to the fourth embodiment will be described.

Figure 17:
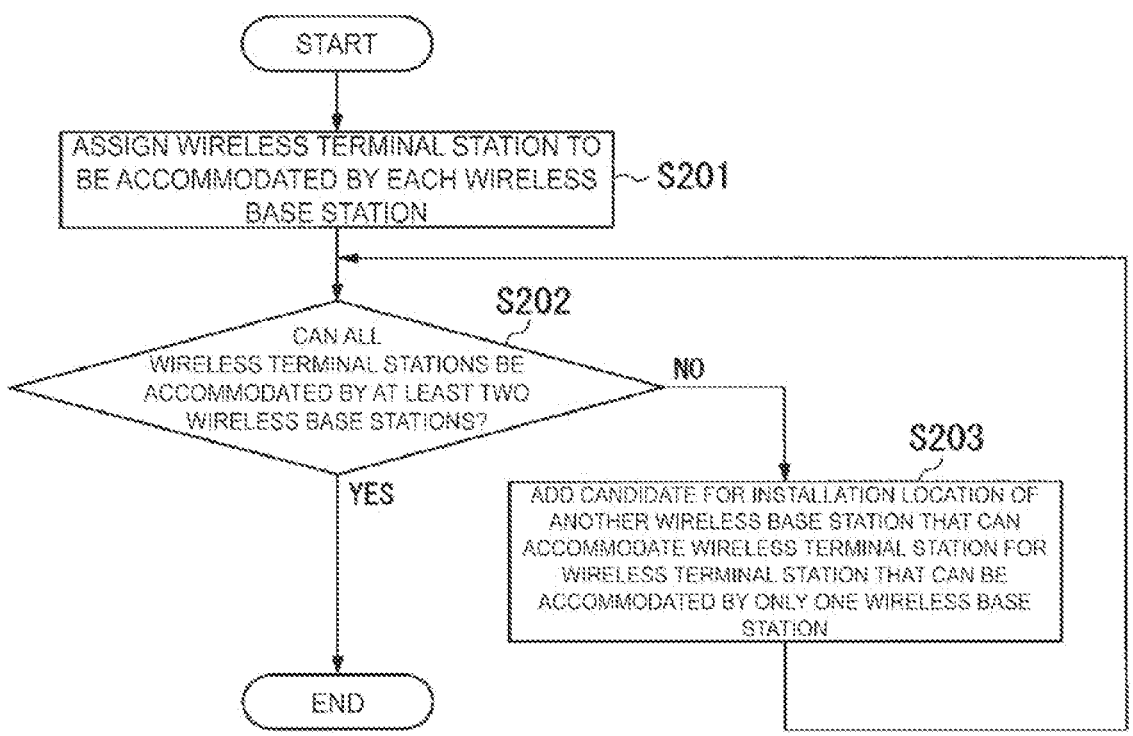
FIG. 17 is a flowchart illustrating an operation of a list generating unit 17 of a station placement design device 1 according to a fourth embodiment of the present invention.

FIG. 17 is a flowchart illustrating the operation of the list generating unit 17 of a station placement design device 1 according to the fourth embodiment. The operation of the list generating unit 17 represented in this flowchart starts when the operation of the station placement design device 1 according to the first embodiment for which flowcharts are illustrated in FIGS. 7 to 9 ends.

The list generating unit 17 selects one combination pattern of candidates for an installation location of a wireless base station which is included in the list L3 illustrated in FIG. 6. The list generating unit 17 assigns wireless terminal stations to be accommodated by each candidate for an installation location of each wireless base station included in the selected combination pattern (step S201).

The list generating unit 17 checks whether or not all the assigned wireless terminal stations can be accommodated by at least two wireless base stations. In a case where there is a wireless terminal station that can be accommodated by only one wireless base station among all the assigned wireless terminal stations (step S202: No), the list generating unit 17 newly adds another candidate for an installation location of a wireless base station that can accommodate the wireless terminal station to the wireless terminal station that can be accommodated by only one wireless base station (Step S203). Then, the list generating unit 17 checks whether or not all the assigned wireless terminal stations can be accommodated by at least two wireless base stations again (step S202).

In a case where all the assigned wireless terminal stations can be accommodated by at least two wireless base stations (steps S202: Yes), the operation of the list generating unit 17 represented in the flowchart illustrated in FIG. 17 ends. The operations described above are performed for each combination pattern of candidates for an installation location of a wireless base station included in the list L3 illustrated in FIG. 6.

Then, the list generating unit 17 adds candidates for an installation location of a wireless base station such that all the assigned wireless terminal stations can be accommodated by at least two wireless base stations for all the combination patterns and then sorts the list (not illustrated in the drawing) in order from the smallest number of candidates for an installation location of a wireless base station to the largest. The list generating unit 17 outputs the sorted list to a list output unit 19, and the list output unit 19 outputs the list.

As described above, the station placement design device 1 (1b) according to the embodiments described above includes the point group data extracting unit 15 and the list generating unit 17. The point group data extracting unit 15 extracts candidates for an installation location of a wireless base station from the point group data in accordance with installation location conditions of the designated wireless base station. The list generating unit 17 performs the following four processes. As a first process, presence/absence of visibility between each of a plurality of designated wireless terminal stations and the candidates for an installation location of a wireless base station is determined based on the point group data. As the second process, a first list (the list L2) including information in which the candidates for an installation location of a wireless base station described above and the wireless terminal stations that are determined to have visibility presence for the candidates for an installation location of a wireless base station described above are associated with each other is generated. As the third process, a second list (the list L3) including information representing combinations of the candidates for an installation location of a wireless base station described above that can accommodate all the wireless terminal stations is generated based on the first list described above. As the fourth process, the second list described above is sorted in order from the smallest number of the candidates for an installation location of a wireless base station described above to the largest.

By employing the configuration as described above, the station placement design device 1 (1b) according to the embodiments described above can easily select candidates for an installation location of a wireless base station that are optimal for a plurality of wireless terminal stations.

The station placement design device according to the embodiments described above can be realized by a computer and a program. In such a case, the program may be configured such that it is recorded on a recording medium or may be configured such that it is provided via a network.

In addition, the station placement design device according to the embodiments described above may be mounted using a plurality of information processing apparatuses that are communicatively connected via a network. In such a case, the functional units included in the station placement design device may be mounted in the plurality of information processing apparatuses in a distributed manner. For example, the point group data extracting unit 15 and the list generating unit 17 may be mounted in mutually-different information processing apparatuses.

All or a part of the station placement design device 1 (1b) according to the embodiments described above may be realized by a computer. In such a case, it may be achieved by recording a program for implementing these functions in a computer-readable recording medium, causing a computer system to read the program recorded in the recording medium, and executing the program. The "computer system" as used herein includes an OS and hardware such as a peripheral device. The "computer-readable recording medium" refers to a portable medium such as a flexible disk, a magneto-optical disk, a ROM, and a CD-ROM, and a storage device such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. In addition, the program described above may be a program used for realizing some of the functions described above, a program that can realize the functions described above by being combined with a program that has already been recorded in a computer system, or a program that is realized using hardware such as a programmable logic device (PLD) or a field programmable gate array (FPGA).

Although the embodiments of the present invention have been described above with reference to the drawings, it is apparent that the embodiments described above are merely examples of the present invention, and the present invention is not limited to the embodiments described above. Thus, addition, omission, substitution, and other modifications of the constituent elements may be made in a range not departing from the technical idea and the gist of the present invention.

REFERENCE SIGNS LIST 1 (1b) Station placement design device
11 Map information storing unit
12 Wireless terminal station location input unit
13 Wireless base station installation condition input unit
14 Point group data storing unit
15 Point group data extracting unit
16 Point group data temporary storing unit
17 (17b) List generating unit
18 (18b) Visibility evaluating unit
19 List output unit
20 Transmission distance/transmission speed evaluating unit

The invention claimed is:

1. A station placement design method comprising:
   extracting candidates for an installation location of a wireless base station from point group data in accordance with designated conditions for an installation location of a wireless base station;
   determining presence/absence of visibility between a plurality of designated wireless terminal stations and the candidates for an installation location of a wireless base station based on the point group data and generating a first list including information in which the candidates for an installation location of a wireless base station and wireless terminal stations determined to have presence of visibility for the candidates for an installation location of a wireless base station are associated with each other;
   generating a second list including information representing combinations of the candidates for an installation location of a wireless base station that enable all of the plurality of designated wireless terminal stations to be accommodated based on the first list;
   sorting the second list in order from the smallest number of the candidates for an installation location of a wireless base station to the largest;
   estimating a transmission speed of a case where a communication system that is able to perform communication in a case where the visibility is absent for wireless terminal stations determined to have absence of visibility for the candidates for an installation location of a wireless base station is used; and
   generating a third list including information in which the wireless terminal stations determined to have absence of visibility for which the estimated transmission speed is equal to or higher than a predetermined value and the candidates for an installation location of a wireless base station are associated with each other.

2. The station placement design method according to claim 1, further comprising:
   generating a fourth list including information representing combinations of the candidates for an installation location of a wireless base station that enable all the plurality of designated wireless terminal stations to be accommodated, which are a union set of the wireless terminal stations determined to have presence of the visibility and the wireless terminal stations determined to have absence of visibility for which the estimated transmission speed is equal to or higher than the predetermined value; and
   sorting the fourth list in order from the smallest number of the candidates for an installation location of a wireless base station to the largest.

3. The station placement design method according to claim 2, further comprising calculating a sum of values of the estimated transmission speeds of all the plurality of designated wireless terminal stations to be accommodated by wireless base stations that are based on the combinations of the candidates for an installation location of a wireless base station included in the fourth list and sorting the fourth list in order from the largest of the sum of values of the transmission speeds to the smallest.

4. The station placement design method according to claim 1, further comprising sorting the second list in order from the smallest deviation of the numbers of wireless terminal stations to be accommodated by the wireless base stations that are based on the candidates for an installation location of a wireless base station to the largest.

5. The station placement design method according to claim 1, further comprising adding the candidates for an installation location of a wireless base station such that all the wireless terminal stations determined to have presence of visibility for the candidates for an installation location of a wireless base station in the first list are capable to be accommodated by at least two or more wireless base stations among the wireless base stations based on the candidates for an installation location of a wireless base station.

6. A station placement design device comprising:
   a processor; and
   a storage medium having computer program instructions stored thereon, when executed by the processor, perform to:
   extract candidates for an installation location of wireless base station from point group data in accordance with designated conditions for installation location of a wireless base station;
   determine presence/absence of visibility between a plurality of designated wireless terminal stations and the candidates for an installation location of a wireless base station based on the point group data, generate a first list including information in which the candidates for an installation location of a wireless base station and wireless terminal stations determined to have presence of visibility for the candidates for an installation location of a wireless base station are associated with each other, generate a second list including information representing combinations of the candidates for an installation location of a wireless base station that enable all the wireless terminal station to be accommodated based on the first list, and sort the second list in order from the smallest number of the candidates for an installation location of a wireless base station to the largest;
   estimate a transmission speed of a case where a communication system that is able to perform communication in a case where the visibility is absent for wireless terminal stations determined to have absence of visibility for the candidates for an installation location of a wireless base station is used; and
   generate a third list including information in which the wireless terminal stations determined to have absence of visibility for which the estimated transmission speed is equal to or higher than a predetermined value and the candidates for an installation location of a wireless base station are associated with each other.

7. The station placement design device according to claim 6, wherein the computer program instructions further perform to
   generate a fourth list including information representing combinations of the candidates for an installation location of a wireless base station that enable all the plurality of designated wireless terminal stations to be accommodated, which are a union set of the wireless terminal stations determined to have presence of the visibility and the wireless terminal stations determined to have absence of visibility for which the estimated transmission speed is equal to or higher than the predetermined value; and
   sort the fourth list in order from the smallest number of the candidates for an installation location of a wireless base station to the largest.

8. The station placement design device according to claim 7, wherein the computer program instructions further perform to calculate a sum of values of the estimated transmission speeds of all the plurality of designated wireless terminal stations to be accommodated by wireless base stations that are based on the combinations of the candidates for an installation location of a wireless base station included in the fourth list and sort the fourth list in order from the largest of the sum of values of the transmission speeds to the smallest.

9. The station placement design device according to claim 6, wherein the computer program instructions further perform to sort the second list in order from the smallest deviation of the numbers of wireless terminal stations to be accommodated by the wireless base stations that are based on the candidates for an installation location of a wireless base station to the largest.

10. The station placement design device according to claim 6, wherein the computer program instructions further perform to add the candidates for an installation location of a wireless base station such that all the wireless terminal stations determined to have presence of visibility for the candidates for an installation location of a wireless base station in the first list are capable to be accommodated by at least two or more wireless base stations among the wireless base stations based on the candidates for an installation location of a wireless base station.

\* \* \* \* \*